(12) United States Patent
James et al.

(10) Patent No.: US 7,644,415 B2
(45) Date of Patent: *Jan. 5, 2010

(54) APPLICATION PROGRAMMING INTERFACE TO THE SIMPLE OBJECT ACCESS PROTOCOL

(75) Inventors: Sarita M. James, Bellevue, WA (US); Shyamalan Pather, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

This patent is subject to a terminal disclaimer.

(21) Appl. No.: 11/099,320

(22) Filed: Apr. 4, 2005

(65) Prior Publication Data

US 2005/0172053 A1    Aug. 4, 2005

Related U.S. Application Data

(63) Continuation of application No. 09/606,923, filed on Jun. 29, 2000, now Pat. No. 6,904,600.

(51) Int. Cl.
*G06F 3/00* (2006.01)
*G06F 15/16* (2006.01)
(52) U.S. Cl. .................. 719/330; 709/201; 709/203
(58) Field of Classification Search .................. 719/328, 719/330; 709/201, 203
See application file for complete search history.

(56) References Cited

U.S. PATENT DOCUMENTS 5,974,416 A * 10/1999 Anand et al. .................. 707/10
6,115,744 A * 9/2000 Robins et al. ............... 709/227
6,457,066 B1 * 9/2002 Mein et al. .................. 709/330

OTHER PUBLICATIONS

Don Box, Inside SOAP, Feb. 2000.*
Scarab:Application Programming Interface(API), The Casbab Project, 1998, 1999.*
Hyunbo Cho, RPC-based Web Service, Derpatment of Industrial Engineering, 1994.*
SOAP : Simple object Access Procotol , Mar. 2000.*
Simple Object Protocol ( SOAP) , Sep. 10, 1999.*
SOAP: The Simple Object Access Protocol, Jan. 2000.*
Box, et al., SOAP: Simple Object Access Protocol, draft-box-http-soap-01.txt>, Nov. 1999. Accessed from bgp.potaroo.net/ietf/all-ids/draft-box-http-soap-01.txt on Jun. 10, 2004.
Box, D. et al., *Web Workshop*, SOAP: Simple Object Access Protocol Specification, © 1999 The Internet Society, msdn.microsoft.com/xml/general/soapspec-v1.asp, Mar. 10, 2000, pp. 1-28.

(Continued)

*Primary Examiner*—Lechi Truong
(74) *Attorney, Agent, or Firm*—Workman Nydegger

(57) ABSTRACT

Systems and computer-readable media implementing methods for providing an application programming interface (API) to the Simple Object Access Protocol (SOAP) are described. The API provides mechanisms for creating all parts of SOAP request messages, for sending the created messages over HTTP to a remote server, and, if the request is successful, for retrieving the response from the remote server, or, in the case of failure, for accessing whatever error information is available. The information passed through the API can be in the form of parameters which allows both the SOAP protocol and the applications that use it to change without requiring changes to the API itself.

14 Claims, 2 Drawing Sheets

OTHER PUBLICATIONS

Skonnard, Aaron, *Microsoft Internet Developer* "SOAP: The Simple Object Access Protocol", Jan. 2000, msdn.microsoft.com/library/periodic/period00/soap.htm, Mar. 27, 2000.

SOAP Frequently Asked Questions (3), develop.com/soap/soapfag.htm, Mar. 27, 2000, pp. 1-7.

Box, Don, *MSDN Magazine*, "A Young Person's Guide to the Simple Object Access Protocol: SOAP Increases Interoperability Across Platforms and Languages", © 2000 Microsoft Corporation, msdn.microsoft.com/library/periodic/period00/soap0300.htm, Mar. 27, 2000.

Web Workshop, XML Developer's Guide, © 1999 Microsoft Corporation, mk:@MSITStore:, Jan. 21, 2002.

Software for Implementing SOAP in a Perl/Win32 Environment, develop.com/soap/ , 2000.

* cited by examiner

APPLICATION PROGRAMMING INTERFACE TO THE SIMPLE OBJECT ACCESS PROTOCOL

REFERENCE TO RELATED APPLICATION

This application is a continuation of U.S. patent application Ser. No. 09/606,923, filed Jun. 29, 2000, now U.S. Pat. No. 6,904,600 and entitled AN APPLICATION PROGRAMMING INTERFACE TO THE SIMPLE OBJECT ACCESS PROTOCOL. Said application is assigned to Microsoft Corporation and is hereby incorporated by reference.

TECHNICAL FIELD

This invention relates generally to computer operating system services, and, more particularly, to an application programming interface to the Simple Object Access Protocol.

BACKGROUND OF THE INVENTION

SOAP ("Simple Object Access Protocol") is a standard method for a client application running on one computer to request services from a server application running on another computer. SOAP encodes remote procedure calls into XML messages that are carried to the server by an HTTP transport protocol. By standardizing the protocol for this much-used service, SOAP eliminates protocol development redundancy and application-specific protocol variations. SOAP has been proposed to the Internet Engineering Task Force for consideration as an Internet communications standard. The proposal may be found at search.ietf.org/internet-drafts/draft-box-http-soap-01.txt.

However, the proposed SOAP standard does not specify an application programming interface (API) to allow applications to easily use SOAP. Each applications development group must individually code the interactions between its application and the SOAP protocol, leading to resource waste through coding replication and possibly to interoperability errors when connecting applications written by different development groups. Therefore, the lack of a standard SOAP API directly counters some of the benefits hoped to be achieved by using SOAP.

SUMMARY OF THE INVENTION

The above problems and shortcomings, and others, are addressed by the present invention, which can be understood by referring to the specification, drawings, and claims. The invention provides a general API for SOAP-using client applications. The API provides mechanisms for creating all parts of SOAP request messages, for sending the created messages over HTTP to a remote server, and, if the request is successful, for retrieving the response from the remote server, or, in the case of failure, for accessing whatever error information is available. Applications developers building on top of this API are freed from redeveloping these general mechanisms and can thus focus on the unique aspects of their applications.

In one embodiment of the present invention, the API consists of software objects. In addition to providing the well-known benefits of an object-oriented interface, this embodiment parameterizes the information passed through the API. Because of this, both the SOAP protocol and the applications that use it can change without requiring changes to the API.

Besides the aspects, features, and advantages described, the invention includes other aspects, features, and advantages that will become apparent from studying the following detailed description and claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
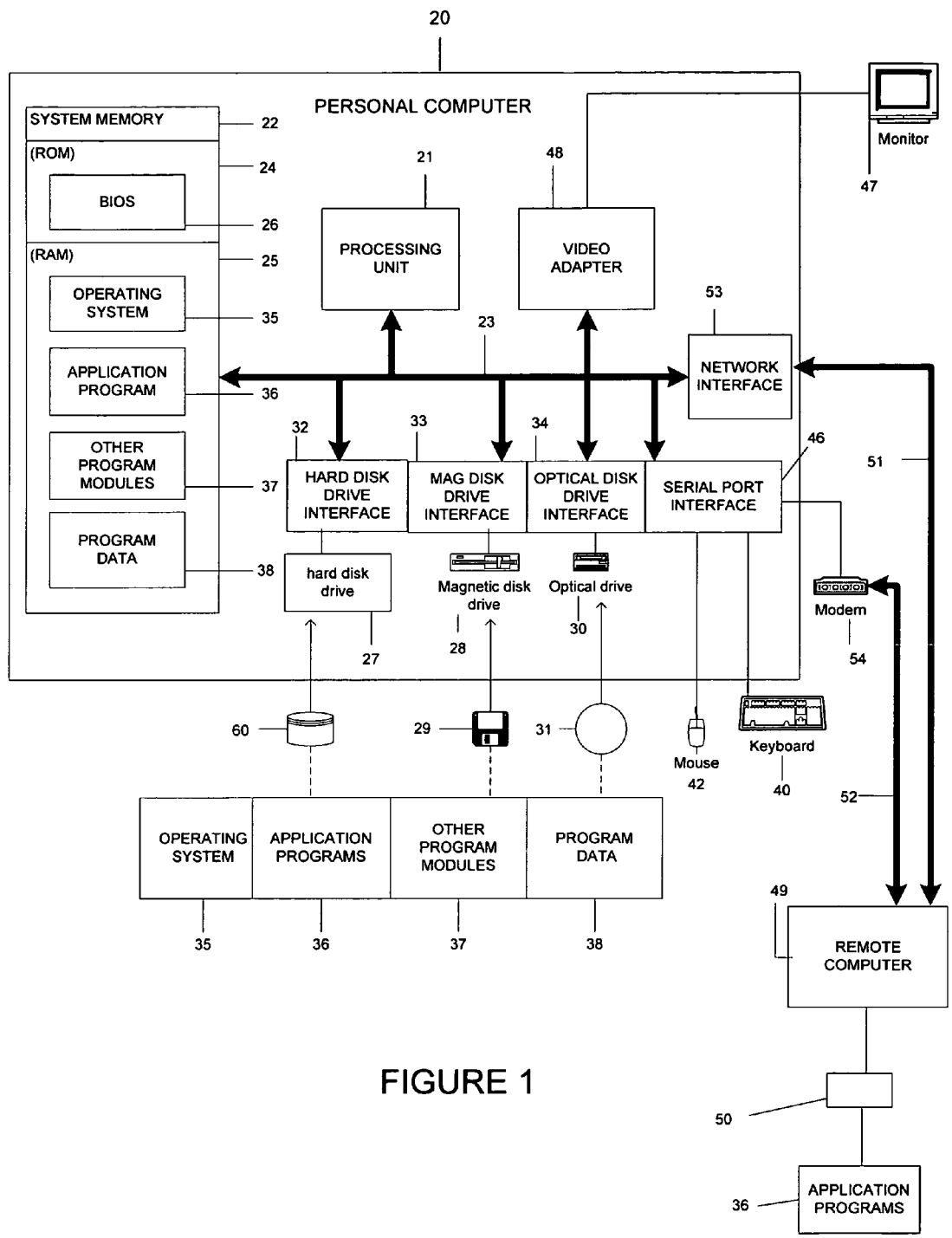
FIG. 1 is a block diagram generally illustrating an exemplary computer system which may support the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Overview of a General-Purpose Computer

With reference to FIG. 1, an exemplary system for implementing the invention includes a general-purpose computing device in the form of a conventional personal computer 20, including a processing unit 21, a system memory 22, and a system bus 23 that couples various system components, including the system memory, to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical medium.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the personal computer 20. Although the exemplary environment described herein employs a hard disk 60, a removable magnetic disk 29, and a removable optical disk 31, it will be appreciated by those skilled in the art that other types of computer-readable media which can store data accessible by a computer, such as magnetic cassettes, flash memory cards, digital video disks, Bernoulli cartridges, random access memories, read only memories, and the like, may also be used in the exemplary operating environment.

A number of program modules may be stored on the hard disk 60, magnetic disk 29, optical disk 31, ROM 24, or RAM 25, including an operating system 35, one or more applications programs 36, other program modules 37, and program data 38. Often, the operating system 35 offers services to applications programs 36 by way of one or more APIs (not shown). Because the operating system 35 incorporates these services, developers of applications programs 36 need not redevelop code to use the services. Examples of APIs provided by operating systems such as Microsoft's "WINDOWS" are well-known in the art.

A user may enter commands and information into the personal computer 20 through input devices such as a keyboard 40 and a pointing device 42. Other input devices (not shown) may include a microphone, joystick, game pad, satellite dish, scanner, and the like. These and other input devices are often connected to the processing unit 21 through a serial port interface 46 that is coupled to the system bus, but may be connected by other interfaces, such as a parallel port, game port, or a Universal Serial Bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device, or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

An Application's Use of an Object-Oriented SOAP API

Figure 2:
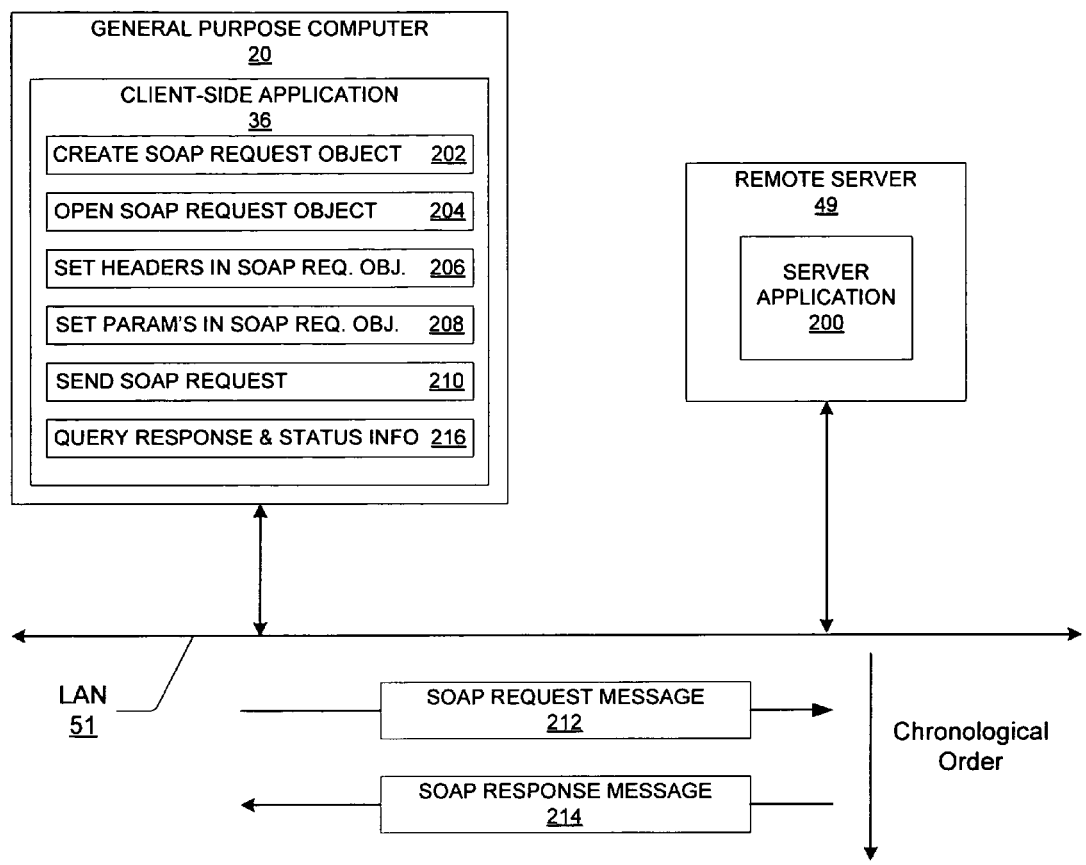
FIG. 2 shows the steps an application may go through when using an object-oriented SOAP API according to one embodiment of the present invention.

In accordance with one aspect of the present invention, FIG. 2 shows the steps an application may go through when using an object-oriented SOAP API. The client-side application 36, shown running on a general-purpose computer 20, needs a service provided by the server application 200. To request the service, the client-side application first creates a SOAP Request Object in step 202. This object conveniently presents to the client-side application all the information it needs with respect to this one SOAP request.

In steps 204-208, the client-side application 36 opens the SOAP Request Object and writes into it the information needed to create the request message. This information includes the address of the server that will process the request and the request itself. According to one aspect of the invention, this information (and the response and status information described below) is passed via parameters: this allows both the client-side application and the SOAP protocol itself to change without requiring changes to the API. When all the information has been presented, the client-side application in step 210 tells the SOAP Request Object to format and send the request.

The SOAP Request message 212 is sent via the HTTP protocol to the remote server 49, shown here connected to the client-side application's host by a LAN 51. The connection between these two machines may be much more elaborate, involving dial-up modems, the Internet, and the like. The SOAP Request message is passed along to the server application 200. Ideally, the server application responds favorably to the request, performs the requested service, and sends back a SOAP Response message 214.

The SOAP API provides one place for retrieving all status and response information relevant to this one SOAP request. In step 216, the client-side application 36 queries the SOAP Request Object. If the request was successfully processed, this Object includes an indication of success along with whatever information the server application 200 passed along. Errors can occur anywhere in the communications system, from the client-side application's mistaken use of the SOAP API, to lack of resources (such as memory) on the client-side application's host machine 20, to congestion on the communications link 51, to unavailability of the remote server 49. Because of this, in the case of an error the SOAP Request Object includes not just a failure indication but as much error-resolution information as can be reasonably gathered.

In order to prevent the client-side application 36 from having to constantly poll the SOAP Request Object for response and status information, the client-side application may be suspended in step 210 when the SOAP request is sent. The client-side application is then reanimated when there is new response or status information for it to process.

A Detailed Usage Guide to an Object-Oriented SOAP API

The steps 202-210, and 216 of FIG. 2 are now described in more detail. A COM-based embodiment of the present invention may be built around an object class called SOAPRequest which exports the interface ISOAPRequest. In the following, coding examples are given in JScript.

Step 202 Create a SOAP Request Object

A SOAP Request Object can be created using COM's standard object creation techniques. The following code creates the object, referring to the SOAPRequest class by the ProgID "SOAPAPI.SOAPRequest."

```
//Create a SOAPRequest Object
    var soapRequest;
    soapRequest = new ActiveXObject("SOAPAPI.SOAPRequest");
```

Step 204 Initialize the SOAP Request Object

A SOAP Request Object is initialized with information about the remote service being requested. The client-side application 36 provides the name of the procedure that will perform the remote service and, optionally, the name of the interface to which the procedure belongs. The following code passes the name of the interface as a URI (Universal Resource Identifier); this is optional and the interpretation of its value is left up to the remote server 49. The procedure name is simply a text string; here it is "LoadFile".

```
//Initialize the SOAPRequest Object
    soapRequest.Open("LoadFile", "IMediaPlayer", "uuid:47edc63b-
        4a80-494a-beea-39122c4a120c");
```

Step 206 Initialize the Headers of the SOAP Request Object

A client-side application 36 may wish to pass information to the remote server application 200 in addition to the information that is strictly part of the request for service. SOAP provides headers for this purpose, each header providing one piece of information for the server application. These headers and their attributes, including their number, names, and values, are not part of the SOAP specification but are defined by the client-side application. One embodiment of the invention parameterizes all of this information, thus allowing the information to change without requiring changes to the API. The information passing through the API in steps 208 and 216 is parameterized for similar reasons.

Each SOAP header is an arbitrary XML fragment containing a single root element. The root element may contain child elements or text. This is an example of a SOAP header called sequenceNumber:

```
<sequenceNumber>
5
</sequenceNumber>
```

Client-side applications 36 create header elements using XML DOM and then add them to a SOAP Request Object by calling the SetHeader( ) method. For more information on XML DOM, see Microsoft's XML Developer's Guide, incorporated herein in its entirety by reference. The following three code segments show the creation and setting of a header. First, create a new XML DOM Document Object that will be used in creating the subsequent XML Nodes to represent each header:

```
//Create an XML DOM Document Object
    var xmlDoc;
    xmlDoc = new ActiveXObject("Microsoft.XMLDOM");
```

Next, use the XML DOM Document Object to create a sequenceNumber element and append to it a text node:

```
//Create the sequenceNumber Node
    var sequenceNumberNode;
    sequenceNumberNode = xmlDoc.createElement("sequenceNumber");
//Create the Text for the sequenceNumber and Attach It
    var sequenceNumberTextNode;
    sequenceNumberTextNode = xmlDoc.createTextNode("5");
    sequenceNumberNode.appendChild(sequenceNumberTextNode);
```

Once the header element is created, it is added to the SOAP Request Object by calling SetHeader( ). SetHeader( ) may also be used to change the value of an existing header.

```
//Add the sequenceNumber as a Header
    soapRequest.SetHeader("sequenceNumber",
        sequenceNumberNode, 1);
```

Because headers are defined by the client-side application 36 and not by the SOAP specification, it is quite possible that the remote server application 200 will receive a header that it does not understand. According to the SOAP specification, a header contains a mustUnderstand attribute. If this attribute is set to 1, then the server application cannot process the request unless it understands this header. SetHeader( )'s third argument is the value of mustUnderstand.

An application can delete a header element by calling DeleteHeader( ) and can read the value of a parameter by querying the HeaderValue property.

Step 208 Initialize the Parameters of the SOAP Request Object

Requests can take any number of parameters of arbitrarily complex data types. Like the header elements described in the previous section, parameter values are expressed as XML fragments. Each parameter element consists of a root element that may contain either child elements or text. This XML fragment shows how a parameter named fileName is specified in a SOAP request:

```
<filename>
    \\host\public\somefile.doc
</filename>
```

An application uses the XML DOM to create a parameter element such as the one shown above, and then calls SetParameter( ) to add it to the SOAP Request Object. SetParameter( ) can also be used to change the value of an existing parameter. The following code creates a parameter element and inserts it into a SOAP Request Object:

```
//Create the fileName Parameter Node
    var fileNameNode;
    fileNameNode = xmlDoc.createElement("fileName");
//Create the Node Containing the File Name Text and Attach It
    var fileNameTextNode;
    fileNameTextNode = xmlDoc.createTextNode
    ("\\host\public\somefile.doc");
    fileNameNode.appendChild(fileNameTextNode);
//Add the File Name as a Parameter
    soapRequest.SetParameter("fileName", fileNameNode);
```

An application can delete a parameter element by calling DeleteParameter( ) and can read the value of a parameter by querying the ParameterValue property.

Step 210 Send the SOAP Request to the Remote Server

Once the headers and parameters are initialized, the client-side application 36 calls the Execute( ) method to send the SOAP request to the remote server 49. The client-side application is suspended until the remote server sends a response, an error occurs, or thirty seconds pass without either of the above happening. In the case of a timeout, the client application resumes and Execute( ) returns a timeout error. In the other cases, Execute( ) returns and response and status information is available in the SOAP Request Object. The next section describes the information that may be returned. The following code sends a SOAP request to a server whose address is expressed as a URL (Uniform Resource Locator).

```
//Execute the SOAP Request
    soapRequest.Execute("http://some_servercontrol/isapictl.dll?app");
```

Step 216 Determine the Result of the SOAP Request

When the Execute( ) method returns, it passes a success or failure code to the client-side application 36. That application may then query various ISOAPRequest properties to read the values returned from the server application 200 (in the case of a successful request) and to access status information.

If Execute( ) returns a success code, then the ResponseElement property contains the contents of the Body element of the XML response sent by the server application 200. The contents of this property are server-dependent and the client-side application 36 should know in advance what to expect. If the SOAP request defines any out parameters (parameters whose values might be changed by the server application), then the client-side application may query their new values by using the ParameterValue property. The ResponseHeaders property returns the contents of the headers sent by the server application 200. Just as a client-side application 36 can send additional information about a request in the SOAP headers, the server application can return additional information in the headers.

When the request fails at the server application 200, the ResponseFaultCode, ResponseFaultString, and ResponseFaultDetail properties are filled from the contents of the server application's error response.

The status of the network protocol is available in the ResponseHTTPStatus (HTTP status code) and ResponseHTTPStatusText (text description of the HTTP status code) properties. The values of these properties are, however, only interesting if there was a network-related failure.

A Detailed Definition of an Object-Oriented SOAP API

In accordance with one aspect of the present invention, the following is a complete definition of the object-oriented SOAP API used to illustrate the examples given above.

```
[
    object,
    uuid(EF 9A C5 05 - 0B 08 - 4F DD - 97 3C - 6B FD C9 A5 AD CA),
    helpstring("ISOAPRequest"),
    pointer_default(unique),
    nonextensible
]
interface ISOAPRequest: IDispatch
{
    //Initialization
        [id(0), helpstring("method Open")]
        HRESULT Open( [in]BSTR bstrMethodName, [in]BSTR
        bstrInterfaceName,
                        [in]BSTR bstrMethodNameSpace);
    //Header Manipulation
        [id(2), helpstring("method SetHeader")]
        HRESULT SetHeader( [in]BSTR bstrName, [in]IUnknown
        *pUnkNewValue,
                        [in]VARIANT_BOOL
                        vbMustUnderstand);
        [id(3), helpstring("method DeleteHeader")]
        HRESULT DeleteHeader([in]BSTR bstrName);
        [propget, id(4), helpstring("property HeaderValue")]
        HRESULT HeaderValue( [in]BSTR bstrName,
                        [out, retval]IUnknown **ppUnkValue);
        [propget, id(5), helpstring("method HeaderMustUnderstand")]
        HRESULT HeaderMustUnderstand([in]BSTR bstrName,
                        [out, retval]
                        VARIANT_BOOL
                        *pvbMustUnderstand);
    //Parameter Manipulation
        [id(7), helpstring("method SetParameter")]
        HRESULT SetParameter([in]BSTR bstrName, [in]IUnknown
        *pUnkNewValue);
        [id(8), helpstring("method DeleteParameter")]
        HRESULT DeleteParameter([in]BSTR bstrName);
        [propget, id(9), helpstring("property ParameterValue")]
        HRESULT ParameterValue( [in]BSTR bstrName,
                        [out, retval]IUnknown
                        **ppUnkValue);
    //Invoke
        [id(10), helpstring("method Execute")]
        HRESULT Execute([in]BSTR bstrTargetURI);
    //Feedback
        [propget, id(11), helpstring("property ResponseElement")]
        HRESULT ResponseElement([out, retval]IUnknown **ppUnkValue);
        [propget, id(12), helpstring("property ResponseHeaders")]
        HRESULT ResponseHeaders([out, retval]IUnknown **ppUnkValue);
        [propget, id(13), helpstring("property ResponseFaultCode")]
        HRESULT ResponseFaultCode([out, retval]BSTR *pbstrValue);
        [propget, id(14), helpstring("property ResponseFaultString")]
        HRESULT ResponseFaultString([out, retval]BSTR *pbstrValue);
        [propget, id(15), helpstring("property ResponseFaultDetail")]
        HRESULT ResponseFaultDetail([out, retval]IUnknown
        **ppUnkValue);
        [propget, id(16), helpstring("property ResponseHTTPStatus")]
        HRESULT ResponseHTTPStatus([out, retval]long *plValue);
        [propget, id(17), helpstring("property ResponseHTTPStatusText")]
        HRESULT ResponseHTTPStatusText([out, retval]BSTR
        *pbstrValue);
    //For Debugging
        [propget, id(18), helpstring("property RequestXMLText")]
        HRESULT RequestXMLText([out, retval]BSTR *pbstrXMLText);
};
```

CONCLUSION

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

We claim:

1. One or more computer-readable storage media containing executable instructions that, when executed by at least one processor, implement a method for an application to communicate with a procedure on a remote server via a Simple Object Access Protocol (SOAP) software object, the method comprising:
   issuing on a computer a call to initialize the SOAP software object, said initialization including specifying the procedure on the remote server;
   issuing a call to set a body of a SOAP request to be used by the SOAP software object, using a set of parameters to specify said body;
   issuing a call to the SOAP software object, in order that the SOAP request be sent to the remote server;
   issuing a call to query the SOAP software object to obtain status information;
   issuing a call to query the SOAP software object to obtain response information sent from the procedure on the remote server; and
   issuing a call to set a header in the SOAP request to be used by the SOAP software object, including in said header a value for a mustUnderstand attribute.

2. The one or more computer-readable storage media of claim 1, wherein the call to the SOAP software object does not return until either response information is received from the remote server or a set amount of time passes.

3. The one or more computer-readable storage media of claim 1, wherein issued calls are to methods of the SOAP software object.

4. The one or more computer-readable storage media of claim 3 further comprising a step of:
   issuing a call to instantiate the SOAP software object.

5. One or more computer-readable storage media containing executable instructions that, when executed by at least one processor, implement a method for communicating with a procedure on a remote server via SOAP, the method comprising:
   initializing on a computer a SOAP software object, the initializing comprising specifying the procedure on the remote server;
   using a set of parameters to specify a body of a SOAP request message to be used by the SOAP software object;
   calling the SOAP software object to request that the SOAP request message be sent to the remote server;
   querying the SOAP software object to obtain status information;
   querying the SOAP software object to obtain response information sent from the procedure on the remote server; and
   setting a header in the SOAP request message to be used by the SOAP software object, the header including a value for a mustUnderstand attribute.

6. The one or more computer-readable storage media of claim 5, wherein the calling to request that a SOAP request message be sent to the remote server does not return until either response information is received from the remote server or until a set amount of time passes.

7. A system for communicating with a procedure on a remote server via a Simple Object Access Protocol using a Simple Object Access Protocol (SOAP) software object, the system comprising:
   at least one processor;
   at least one memory coupled with the at least one processor and storing instructions that when executed by the at least one processor, cause the at least one processor to perform:
   initializing the SOAP software object by specifying the procedure on the remote server;
   setting a body of a SOAP request to be used by the SOAP software object, using a set of parameters to specify said body;
   calling the SOAP software object to send the SOAP request to the remote server;
   issuing a call to query the SOAP software object to obtain status information;
   issuing a call to query the SOAP software object to obtain response information sent from the procedure on the remote server; and
   setting a header in the SOAP request to be used by the SOAP software object, said header including a value for a mustUnderstand attribute.

8. The system of claim 7, wherein the call to the SOAP software object does not return until either response information is received from the remote server or a set amount of time passes.

9. The system of claim 7, wherein issued calls are to methods of the SOAP software object.

10. The system of claim 9,
   wherein the memory includes instructions that when executed by the at least one processor, cause the at least one processor to issue a call to instantiate the SOAP software object.

11. A system for communicating with a procedure on a remote server via a Simple Object Access Protocol using a Simple Object Access Protocol (SOAP) software object, the system comprising:
   a processor; and
   at least one memory coupled with the processor and having stored thereon instructions that when executed by the processor cause the processor to initialize on the system the SOAP software object by specifying the procedure on the remote server, set a body of a SOAP request to be used by the SOAP software object, using a set of parameters to specify said body, call the SOAP software object to send the SOAP request to the remote server, issue a call to query the SOAP software object to obtain status information, issue a call to query the SOAP software object to obtain response information sent from the procedure on the remote servers, and set a header in the SOAP request to be used by the SOAP software object, said header including a value for a mustUnderstand attribute.

12. The system of claim 11, wherein the call to the SOAP software object does not return until either response information is received from the remote server or a set amount of time passes.

13. The system of claim 11, wherein issued calls are to methods of the SOAP software object.

14. The system of claim 13, wherein the system is configured to issue a call to instantiate the SOAP software object.

* * * * *